United States Patent
Saini et al.

(10) Patent No.: US 10,681,216 B2
(45) Date of Patent: Jun. 9, 2020

(54) TECHNOLOGIES FOR MANAGING UNRESOLVED CUSTOMER INTERACTIONS

(71) Applicant: GENESYS TELECOMMUNICATIONS LABORATORIES, INC., Daly City, CA (US)

(72) Inventors: Ranjeet Saini, Hyderabad (IN); Partha Pratim Roy, Hyderabad (IN); Vikas Srivastava, Hyderabad (IN)

( * ) Notice: Subject to any disclaimer, the term of this patent is extended or adjusted under 35 U.S.C. 154(b) by 0 days.

(21) Appl. No.: 15/727,480

(22) Filed: Oct. 6, 2017

(65) Prior Publication Data

US 2019/0109945 A1  Apr. 11, 2019

(51) Int. Cl.
*H04M 3/523* (2006.01)
*H04M 3/42* (2006.01)

(52) U.S. Cl.
CPC ..... *H04M 3/5235* (2013.01); *H04M 3/42059* (2013.01); *H04M 2203/551* (2013.01)

(58) Field of Classification Search
CPC .................. H04M 3/42059; H04M 2203/551
USPC .................................... 379/265.13
See application file for complete search history.

(56) References Cited

U.S. PATENT DOCUMENTS

| 8,542,816 | B2 * | 9/2013 | Kaufman | H04M 3/5125 379/265.12 |
| 8,553,872 | B2 * | 10/2013 | Geffen | G06Q 10/06 379/265.01 |
| 8,670,545 | B2 * | 3/2014 | Vendrow | H04M 3/02 370/352 |
| 2013/0282744 | A1 * | 10/2013 | Hartman | H04M 3/5183 707/758 |

* cited by examiner

Primary Examiner — Ahmad F. Matar
Assistant Examiner — Jirapon Intavong

(57) ABSTRACT

Technologies for managing unresolved customer interactions in a support call management system are disclosed, including receiving a support call from a customer; identifying a customer and a support call type; retrieving historical interaction data associated with the customer; determining subsequent to having determined that historical interaction data associated with the customer includes other support calls, whether the other support calls are related to the received support call based in part on the historical interaction data and the support call type; determining whether to transmit the support call to an agent, an expert, or a supervisor as a function of at least one characteristic of the other support calls; and placing the support call into a support call queue as a function of the determination of whether the support call is to be transmitted to one of the agent, the expert, or the supervisor.

9 Claims, 4 Drawing Sheets

# TECHNOLOGIES FOR MANAGING UNRESOLVED CUSTOMER INTERACTIONS

BACKGROUND OF THE DISCLOSED EMBODIMENTS

Nearly every goods and services provider offers some degree of support to those customers who buy or user their products and/or services. Support can come in many forms using various mediums, such as a phone call, video chat, email, a messenger service, etc. Having a respectable customer support system can play an integral role in building/maintaining a company's brand. As such, companies often go to great lengths to ensure their customer's support needs are met. To meet those support needs, companies employ any number of customer service agents.

Unfortunately, not every interaction between a customer and a service agent is effectively resolved. For example, a support call may get dropped to no fault of the customer or service agent, a period of time may be required to elapse before further assistance can be provided, an issue reappears subsequent to the conclusion of a previous support call, etc. Under such conditions, the customer may become frustrated and irritated, making it more difficult for the responding service agent to successfully manage the interaction. Accordingly, there exists a need for improvements in technologies for managing unresolved customer interactions.

SUMMARY OF THE DISCLOSED EMBODIMENTS

In one embodiment, a method for managing unresolved customer interactions in a support call management system is disclosed, the method comprising: receiving, by the support call queue management system, a support call from a customer; identifying, by an interaction management computing device of the support call queue management system, a customer and a support call type associated with the support call; retrieving, by the interaction management computing device, historical interaction data associated with the customer; determining, by the interaction management computing device and subsequent to having determined that historical interaction data associated with the customer includes one or more other support calls, whether one or more of the other support calls are related to the received support call based at least in part on the historical interaction data associated with the customer and the support call type of the support call; determining, by the interaction management computing device and subsequent to having determined that the one or more of the other support calls are related to the received support call, whether to transmit the support call to one of an agent, an expert, or a supervisor as a function of at least one characteristic of the one or more other support calls; and placing, by the interaction management computing device, the support call into a support call queue of a plurality of support call queues as a function of the determination of whether the support call is to be transmitted to one of the agent, the expert, or the supervisor.

Other embodiments are also disclosed.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
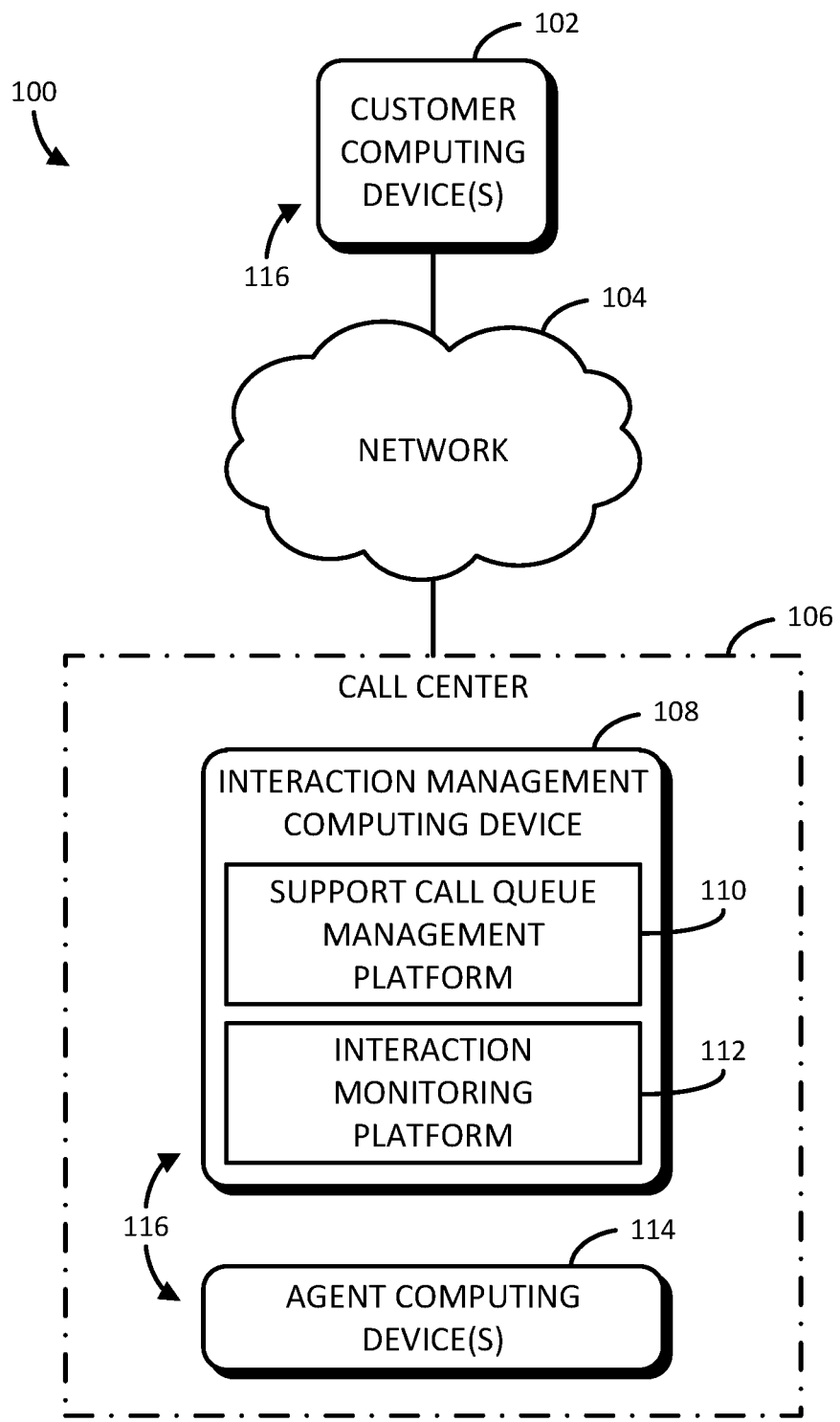
FIG. 1 is a simplified block diagram of an illustrative embodiment for managing unresolved customer interactions which is illustratively shown in a support call management system that includes an interaction management computing device and one or more agent computing devices.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 is an illustrative support call management system 100 for managing unresolved customer interactions which is illustratively shown as including one or more customer computing devices 102 communicatively coupled to a call center 106 via a network 104. The illustrative call center 106 includes an interaction management computing device 108 and one or more agent computing devices 114. In an illustrative example, a customer of a good and/or service provider contacts the provider's service/support line (e.g., via a respective one of the customer computing devices 102) in an effort to speak with an agent (e.g., a customer service agent) of the good and/or service provider. Upon receipt of the support call, the interaction management computing device 108, or more particularly the support call queue management platform 110 of the interaction management computing device 108, is configured to route the support call to a customer service agent (e.g., via their respective agent computing device 114), and determines which agent to route the call to.

As illustratively shown, the interaction management computing device 108 includes an interaction monitoring platform 112 which, as will be described in further detail below, is configured to monitor and collect information (e.g., about the user, about the call, about the agent(s), etc.) associated with the support call. Such support call information may include any information that describes a characteristic of the customer (e.g., a telephone number, geographic location, demographic information, etc.), a characteristic of the agent(s)/supervisor(s) that assisted on the support call (e.g., an agent/supervisor identifier), or a characteristic of the call itself. Such support call information of the call itself may include, for example, information about a support call queue in which the call was placed, a duration of time associated with the support call (e.g., a duration of time the support call was in the queue, a duration of time the support call was on hold, a duration of time the support call was speaking with an agent, etc.), a resolution, and/or other information associated with the interaction between the consumer and an agent/supervisor (e.g., a status, notes, ratings, etc.).

In use, as described in further detail below, the support call queue management platform 110 is configured to analyze data monitored and collected by the interaction monitoring platform 112 to manage unresolved customer interactions. Such unresolved customer interactions may result from: the support call being dropped to no fault of the customer or service agent (e.g., the customer computing device 102 losing its wireless connection to the network 104 due to poor reception or interference); a period of time may be required to pass before further assistance can be provided; the issue prompting the support call reappears subsequent to the conclusion of a previous support call, etc.

To do so, the support call management platform 110 is configured to determine whether an incoming/received support call for a particular customer is related to a previously received support call for that customer. If so, the support call queue management platform 110 is configured to automatically flag the call, determine whether to transfer the call to an agent (e.g., the agent associated with the previous call or another agent), an expert (e.g., a more experienced and/or more highly trained agent), or a supervisor, and place the support call into the appropriate support call queue.

As described previously, the call center 106 illustratively includes the interaction management computing device 108 and the agent computing device(s) 114. It should be appreciated that the call center 106 may be comprised of any number of compute/storage servers, as well as other network devices (e.g., switches, hubs, routers, access points, etc.), which may be housed in a data center, for example. It should be further appreciated that, in other embodiments, the illustrative interaction management computing device 108 and/or one or more of the agent computing device(s) 114 may not be located in the call center 106, but instead in a location such as in a remote cloud infrastructure.

The customer computing device(s) 102, the interaction management computing device 108, and the agent computing device(s) 114 may each be embodied as any type of computing device 116 capable of performing the respective functions described herein. For example, in some embodiments, one or more of the customer computing devices 102 and the agent computing devices 114 may be embodied as desktop computers or mobile computing devices (e.g., smartphones, wearables, tablets, laptops, notebooks, etc.). In furtherance of the example, in some embodiments, the interaction management computing device 108 may be embodied as one or more servers (e.g., stand-alone, rack-mounted, etc.), compute devices, storage devices, and/or combination of compute blades and data storage devices (e.g., of a storage area network (SAN)) in a cloud architected network or data center.

Additionally, it should be appreciated that each of the interaction management computing device 108 and the agent computing device(s) 114, while illustratively shown as single computing devices 116, may be comprised of more than one computing device 116 in other embodiments (e.g., in a distributed computing architecture), each of which may be usable to perform at least a portion of the functions described herein of the respective computing device 116. In an illustrative example, one or more functions of the interaction management computing device 108 (e.g., those functions associated with the support call management platform 110) may be executed on one or more computing devices 116, while one or more same, additional, or alternative functions of the interaction management computing device 108 (e.g., those functions associated with the interaction monitoring platform 112) may be executed on one or more other computing devices 116.

Figure 2:
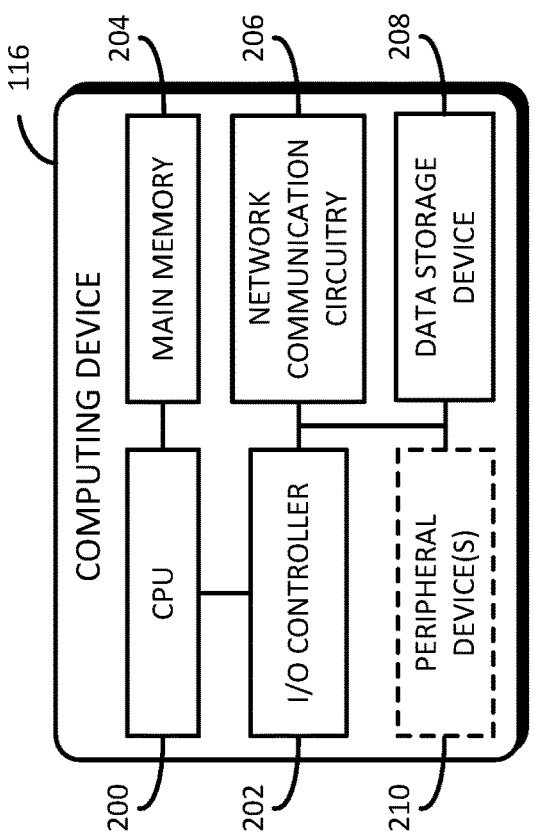
FIG. 2 is a simplified block diagram of an illustrative embodiment of at least one of the computing devices of the system of FIG. 1.

Referring now to FIG. 2, an illustrative computing device 116 (e.g., one of the customer computing devices 102, the interaction management computing device 108, and/or one of the agent computing devices 114) includes a central processing unit (CPU) 200, an input/output (I/O) controller 202, a main memory 204, network communication circuitry 206, a data storage device 208, and, in some embodiments, one or more I/O peripherals 210. In some alternative embodiments, the computing device 116 may include additional, fewer, and/or alternative components to those of the illustrative computing device 116, such as a graphics processing unit (GPU). It should be appreciated that one or more of the illustrative components may be combined on a single system-on-a-chip (SoC) on a single integrated circuit (IC).

Additionally, it should be appreciated that the type of components and/or hardware/software resources of the respective computing device 116 may be predicated upon the type and intended use of the respective computing device 116. For example, the interaction management computing device 108 may not include any peripheral devices 210. Additionally, as described previously, the interaction management computing device 108 may be comprised of more than one computing device 116. Accordingly, in such embodiments, it should be further appreciated that one or more computing devices 116 of the interaction management computing device 108 may be configured as a database server with less compute capacity and more storage capacity relative to another of the computing devices 116 of the interaction management computing device 108. Similarly, one or more other computing devices 116 of the interaction management computing device 108 may be configured as an application server with more compute capacity and less storage capacity relative to another of the computing devices 116 of the interaction management computing device 108.

The CPU 200, or processor, may be embodied as any combination of hardware and circuitry capable of processing data. In some embodiments, the computing device 116 may include more than one CPU 200. Depending on the embodiment, the CPU 200 may include one processing core (not shown), such as in a single-core processor architecture, or multiple processing cores, such as in a multi-core processor architecture. Irrespective of the number of processing cores and CPUs 200, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 116. Illustratively, the I/O controller 202 is configured to receive input/output requests from the CPU 200, and send control signals to the respective input/output devices, thereby managing the data flow to/from the computing device 116.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 116 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 116 to a computer network, as well as other devices, depending on the embodiment.

The data storage device 208 may be embodied as any type of computer hardware capable of the non-volatile storage of data (e.g., semiconductor storage media, magnetic storage media, optical storage media, etc.). Such data storage devices 208 are commonly referred to as auxiliary or secondary storage, and are typically used to store a large amount of data relative to the memory 204 described above.

The I/O peripherals 210 may be embodied as any type of auxiliary device configured to connect to and communicate with the computing device 116. Depending on the embodiment, the one or more I/O peripherals 210 may include a display, a microphone, a speaker, a mouse, a keyboard, a touchscreen, a camera, a printer, a scanner, etc. Accordingly, it should be appreciated that some I/O devices are capable of one function (i.e., input or output), or both functions (i.e., input and output).

In some embodiments, the I/O peripherals 210 may be connected to the computing device 116 via a cable (e.g., a ribbon cable, a wire, a universal serial bus (USB) cable, a high-definition multimedia interface (HDMI) cable, etc.) connected to a corresponding port (not shown) of the computing device 116 through which the communications made therebetween can be managed by the I/O controller 202. In alternative embodiments, the I/O peripherals 210 may be connected to the computing device 116 via a wireless mode of communication (e.g., Bluetooth®, Wi-Fi®, etc.) which may be managed by the network communication circuitry 206.

Referring back to FIG. 1, as noted previously, the customer computing devices 102 are communicatively coupled to the call center 106 via the network 104. The network 104 may be implemented as any type of wired and/or wireless network, including a local area network (LAN), a wide area network (WAN), a global network (the Internet), etc. Accordingly, the network 104 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, compute devices, storage devices, etc. It should be appreciated that the customer computing devices 102 and the call center 106 may use different networks (e.g., LANs, provider networks, etc.) to connect to the backbone of the network 104 such that a number of communication channels can be established therein to enable communications therebetween.

Figure 3:
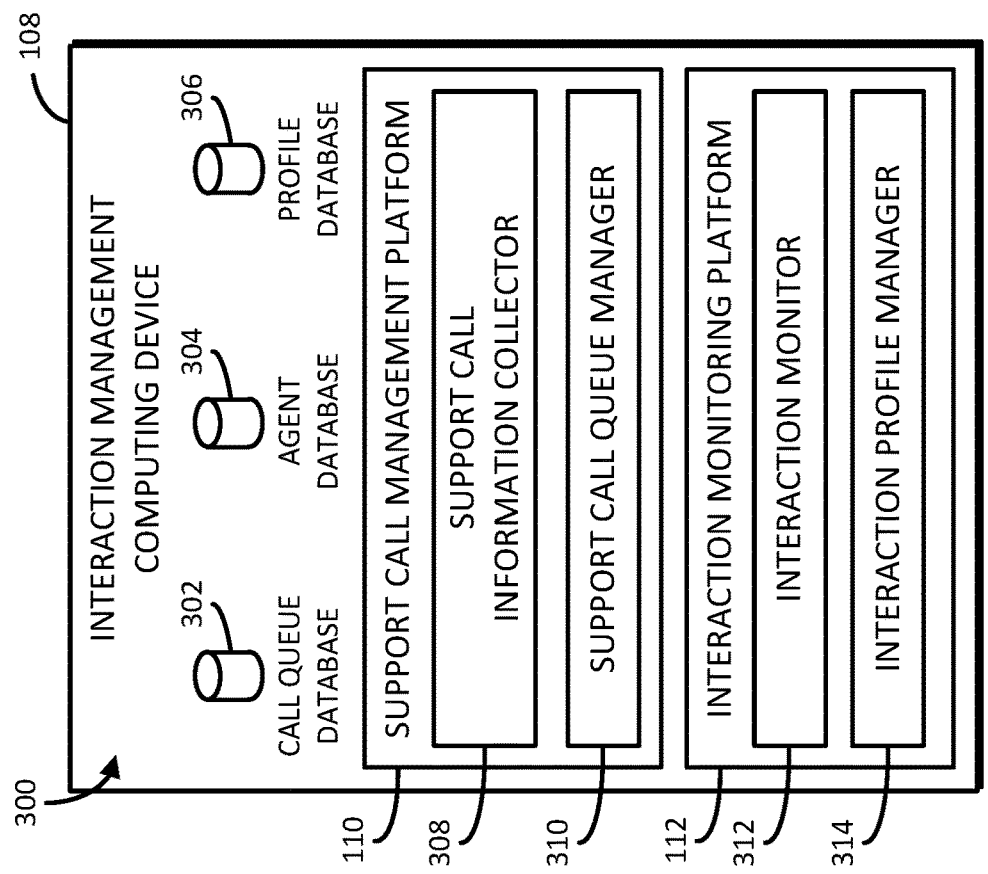
FIG. 3 is a simplified block diagram of an illustrative embodiment of an environment of the interaction management computing device of FIG. 1.

Referring now to FIG. 3, an illustrative environment 300 of the interaction management computing device 108 includes the support call queue management platform 110 and the interaction monitoring platform 112, each of which may be embodied as any combination of hardware, firmware, software, or circuitry usable to perform the functions described herein. Further, each of the support call queue management platform 110 and the interaction monitoring platform 112 include or otherwise have access to one or more computer-readable medium (e.g., the memory 204, the data storage device 208, and/or any other media storage device) having instructions stored thereon and one or more processors (e.g., the CPU 200) coupled with the one or more computer-readable medium and configured to execute instructions to perform the functions described herein. While the functionality of the support call queue management platform 110 and/or the interaction monitoring platform 112 may be described herein as being performed by a particular component or set of components, it should be appreciated that, in other embodiments, the support call queue management platform 110 and/or the interaction monitoring platform 112 may include additional and/or alternative components for performing the functions described herein.

The illustrative environment 300 includes a call queue database 302, an agent database 304, and a profile database 306. It should be appreciated that, in some embodiments, the data stored in the respective databases as described herein may not be mutually exclusive. In other words, certain data described herein as being stored in one database may additionally or alternatively be stored in another database described herein, or another database altogether. It should be further appreciated that, in some embodiments, the data may be stored in a single database, or an alternative database/data storage arrangement.

Additionally, the illustrative databases described herein may be combined or further segregated, in other embodiments. In some embodiments, access to the data provided to and/or generated as described herein may require authorization and/or that such data be encrypted while in storage and/or transit. Accordingly, in such embodiments, one or more authentication and/or encryption technologies known to those of skill in the art may be employed to ensure the storage and access to the data complies with any legal and/or contractual requirements.

The illustrative support call queue management platform 110 includes a support call information collector 308 and a support call queue manager 310. The support call information collector 308 is configured to collect support call information and store the collected support call information for later retrieval and analysis. In some embodiments, the support call information may be stored in the profile database 306. The support call information may include any kind of information related to the support call that is usable to identify the customer and a reason for the support call. For example, the support call information may include, but is not limited to, an identifier of the customer (e.g., a telephone number, an account identifier, etc.), a type of support being requested (e.g., technical support, billing, customer service, general inquiry, etc.), geographic information associated with the call, etc. Accordingly, it should be appreciated that the support call information collector 308 may be configured to collect support call information manually from the customer (e.g., via voice commands, key presses, etc.) and/or to determine support call information based on metadata associated with the support call.

The support call queue manager 310 is configured to receive inbound support call traffic and route the support calls to the appropriate customer service agents (e.g., via their respective agent computing devices 114). To do so, the support call queue manager 310 is configured to create/remove support call queues, identify an appropriate support call queue for each call, and forward the calls from the support call queues to the agents/supervisors associated with the respective support call queue(s). The support call queue manager 310 is configured to determine which support call queue in which to place the call based on one or more support call queue factors, which may include the type of support being requested (e.g., customer service, billing, tech support, etc.), one or more characteristics of the customer (e.g., demographic data of the customer, geographic data of the customer, customer support history, etc.), one or more characteristics of the support call queue (e.g., a present volume of the support call queue, a capacity of the support call queue, a location of the agent(s) responsible for the support call queue, etc.), etc. In some embodiments, such support call queue information may be stored in the call queue database 302.

Additionally, the support call queue manager 310 is configured to determine the support call queue in which the call is placed as a function of one or more factors associated with the agent(s)/supervisor(s) for a particular support call queue. Such agent/supervisor factors may include an availability of the agent(s)/supervisor(s) to take the support call, a present call volume, a level of training received by the respective agent(s)/supervisor(s), a work schedule associated with the agent(s)/supervisor(s), etc. Additionally, in some embodiments, the historical interaction data between the agent(s)/supervisor(s) and a customer associated with the support call.

The illustrative interaction monitoring platform 112 includes an interaction monitor 312 and an interaction profile manager 314. The interaction monitor 312 is configured to monitor and collect information (i.e., historical interaction information) related to the call between the customer and the agent(s)/supervisor(s). In other words, the interaction monitor 312 is configured to monitor certain metrics of the call throughout the call, as well as receive input (e.g., from the agent, supervisor, and/or customer) which may be associated with the call.

In some embodiments, the historical interaction information may be stored in the profile database 306. The historical interaction information may include information related to the one or more agents/supervisors taking part in the support call (e.g., agent identifier(s), notes, a resolution code, etc.), information associated with the support call itself during the customer/agent interaction (e.g., a start time, an end time, an amount of time the support call has been placed on hold, etc.), agent/supervisor notes, status information, resolution information, etc. The historical interaction information may additionally or alternatively include information related to the customer (e.g., a customer identifier, demographic/billing information associated with the customer, the goods/services provided to that customer over a period of time, etc.) and/or the call itself (e.g., start/end times, hold times, support call type, customer(s), agent(s)/supervisor(s), region from which the support call(s) originates, the call center at which the support call was handled, etc.).

The interaction profile manager 314 is configured to manage profiles associated with the support calls, the customers, and/or the agents/supervisors. In an illustrative example, a support call profile may include information about a particular support call and/or information about a set of related support calls, such as may be related by one or more characteristics of the call, including support call type, customer(s), agent(s)/supervisor(s), region from which the support call(s) originates, the call center (e.g., the call center 106) at which the support call was handled, etc. In another illustrative example, the customer profile may include information about a particular customer, such as demographic information associated with the customer, the goods/services provided to that customer over a period of time, a history of interaction information associated with the customer (e.g., historical records of previous/present interactions between that customer and the respective agent(s)/supervisor(s)), etc. In some embodiments, the profiles may be stored in the profile database 306.

Figure 4A:
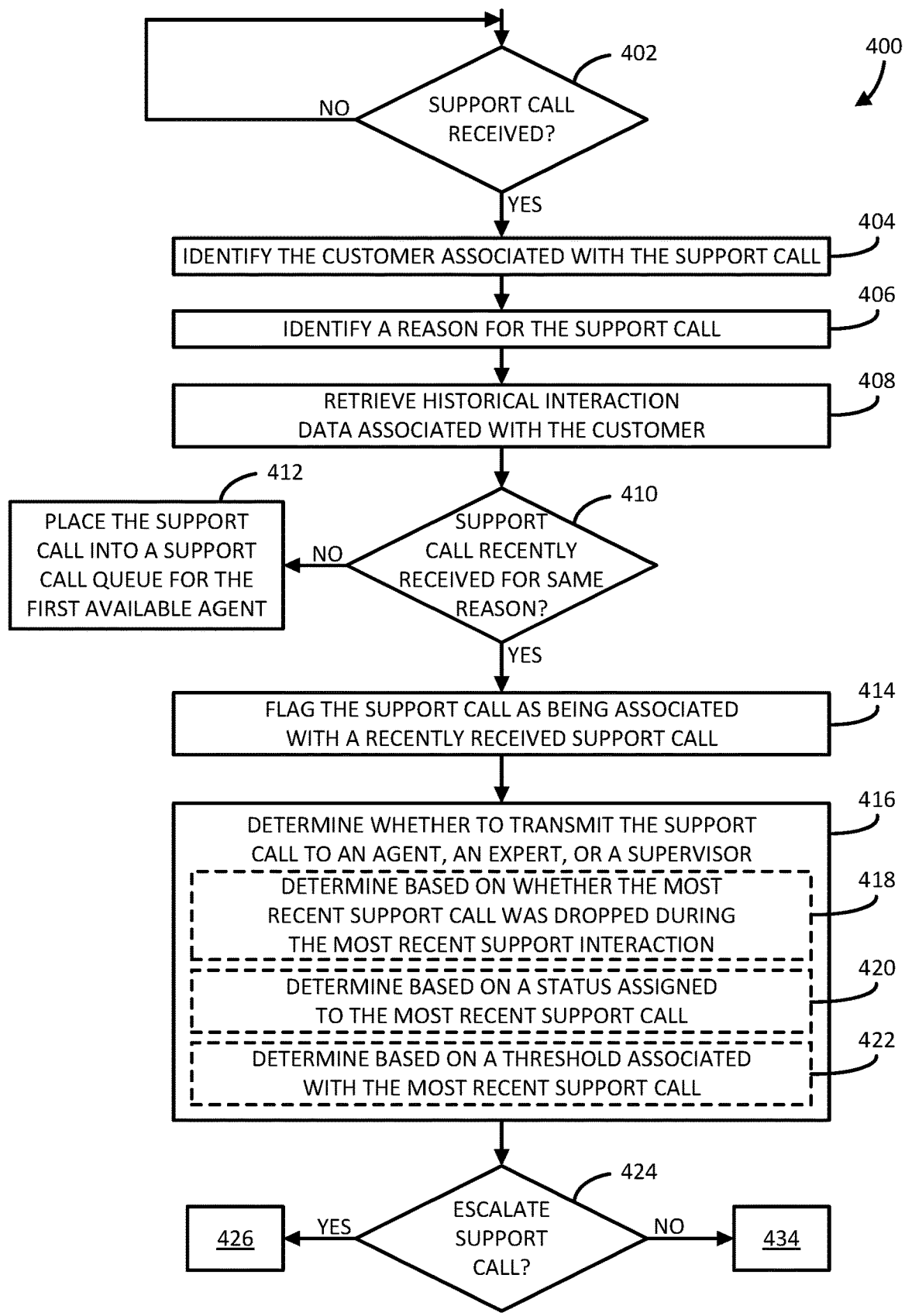
FIGS. 4A-4C are a simplified flow diagram of an illustrative embodiment of a method for managing unresolved customer interactions that may be executed by the interaction management computing device of FIGS. 1 and 3.
Figure 4B:
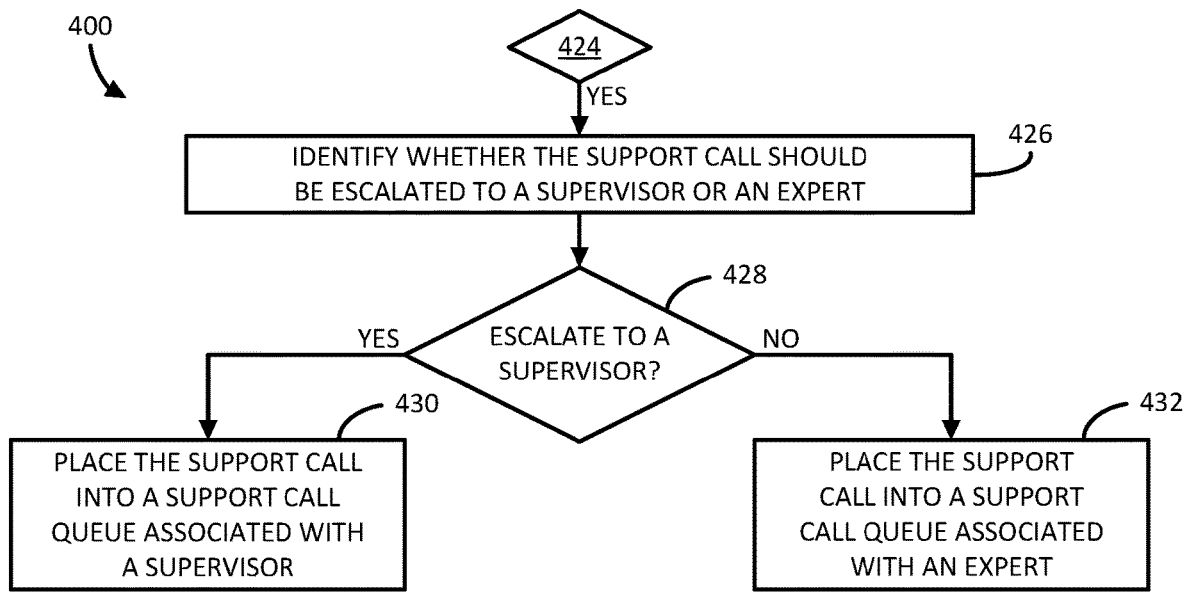
Figure 4C:
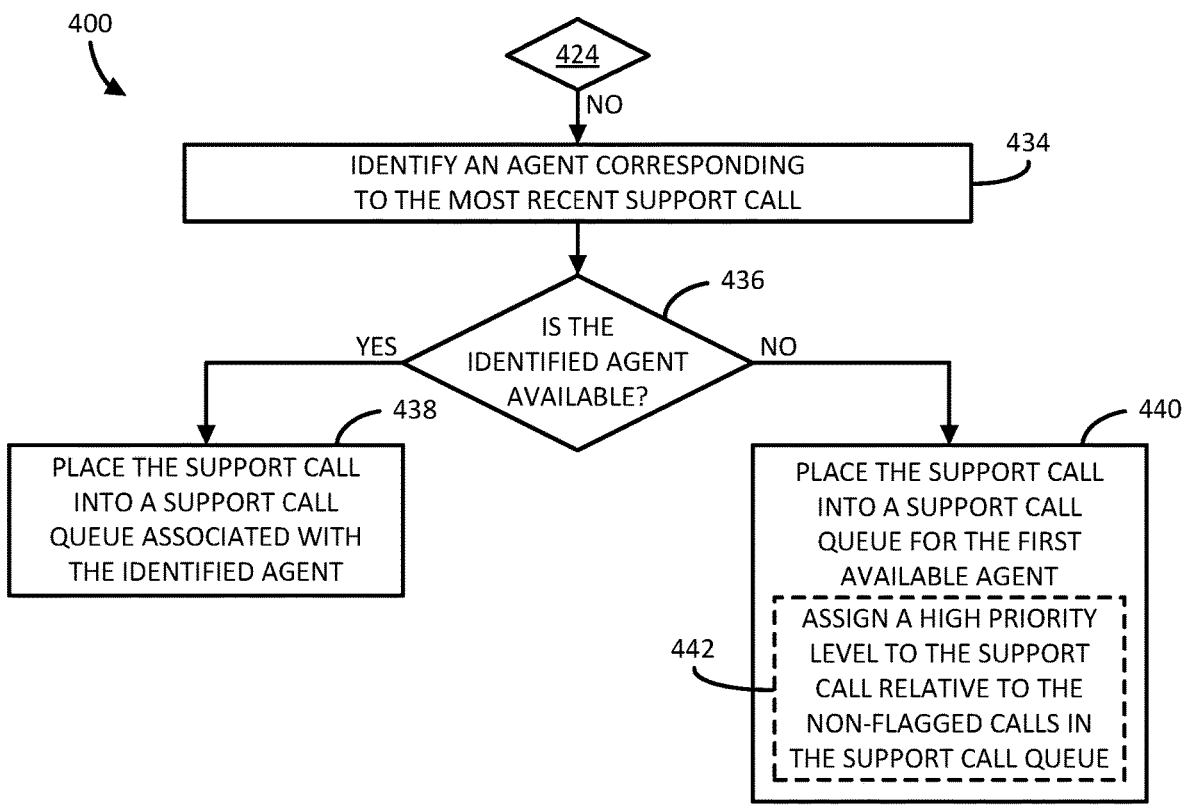

Referring now to FIGS. 4A-4C, an illustrative method 400 is provided for managing unresolved customer interactions which may be executed by the interaction management computing device 108, or more particularly the support call queue management platform 110 and/or the interaction monitoring platform 112 of the interaction management computing device 108. The method 400 begins in block 402, in which the interaction management computing device 108 determines whether a service/support call has been received. If a call has been received, the method 400 advances to block 404.

In block 404, the interaction management computing device 108 identifies the customer associated with the support call. In some embodiments, the customer may be identified based on information received from the customer (e.g., in response to having been prompted to provide certain information) and/or metadata associated with the support call. In block 406, the interaction management computing device 108 identifies a reason for the support call, such as a customer service call, a goods/services procurement call, a billing call, a technical support call, etc. In some embodiments, the reason for the support call may be identified based on information received from the customer (e.g., in response to having been prompted to provide certain information).

In block 408, the interaction management computing device 108 retrieves historical interaction data associated with the customer, which may be contained in a customer profile, such as may be stored in the profile database 306 of FIG. 3. In block 410, the interaction management computing device 108 determines whether the support call received in block 402 corresponds to another support call recently received from the same customer identified in block 404 and for the same reason as identified in block 406. If not, the method 400 branches to block 412, in which the interaction management computing device 108 places the support call into a support call queue for the first available agent. Otherwise, the method 400 branches to block 414, in which the interaction management computing device 108 flags the call as being associated with a recently received support call. Whether the other support call may be classified as a recently received support call may be determined based on a threshold, such as 48 hours, one week, ten days, two weeks, etc.

In block 416, the interaction management computing device 108 determines whether to transmit the support call to an agent, an expert, or a supervisor based on one or more characteristics associated with the most recent support call. It should be appreciated that the interaction management computing device 108 collects and stores such characteristics throughout the duration of the support call in some embodiments. As described previously, the characteristics may include information associated with the support call (e.g., a time at which the support call was received, a time at which the support call was inserted into a queue, a time at which the support call was transferred to an agent, a duration of the support call, a time at which the support call was resolved/dropped, etc.), information associated with the customer, and/or information associated with one or more agents and/or supervisors that assisted on the previous support call. As also described previously, such information may be stored in an associated profile, which may be stored in a profile database of the interaction management computing device 108 (e.g., the profile database 306 of FIG. 3).

For example, in some embodiments, in block 418, the interaction management computing device 108 determines whether to transmit the support call to an agent, an expert, or a supervisor based on whether the most recent call was dropped during the most recent support interaction. In another example, in some embodiments, in block 420, the interaction management computing device 108 determines whether to transmit the support call to an agent, an expert, or a supervisor based on a resolution status assigned to the most recent support call. For example, the resolution status may provide an indication (e.g., usable by a subsequent agent, expert, or supervisor) that is usable to determine how the support call was concluded, such as whether the support call was resolved, requires an on-site technician, resulted in processing a billing correction, resulted in processing a service change, requires awaiting a return of goods, an indication as to whether the support call was still unresolved at the time the interaction concluded for a particular reason (e.g., a dropped call, the customer hung up in frustration, etc.), etc.

In still another example, in some embodiments, in block 422, the interaction management computing device 108 determines whether to transmit the support call to an agent, an expert, or a supervisor based on a threshold associated with the most recent support call. In an illustrative example, the threshold may be a maximum call duration threshold, such as five minutes, ten minutes, etc. Accordingly, under such conditions, if the previous support call duration exceeded the maximum call duration, the interaction management computing device 108 may determine to escalate the support call to an expert or a supervisor; otherwise, the interaction management computing device 108 may determine that an agent is capable of taking the support call. In another illustrative example, the threshold may be a maximum call count threshold, such as two calls in a 24 hour window, three calls in a week, etc. It should be appreciated that the interaction management computing device 108 may be configured to determine whether to transmit the support call to an agent, an expert, or a supervisor based on more than one threshold.

In block 424, the interaction management computing device 108 determines whether to escalate the support call to a supervisor or an expert. If not, the method 400 branches to block 434, which is shown in FIG. 4C and described below; otherwise, the method 400 branches to block 426, which is shown in FIG. 4B. It should be appreciated that, irrespective of whether the method 400 branches to block 434 or block 426, the interaction management computing device 108 may be configured to display historical interaction information associated with the prior support call(s) corresponding to this particular customer.

Such historical interaction information may include any details associated with the most recent support call and may additionally include any details associated with other support calls corresponding to this particular customer in which the same or similar issue was encountered and/or that fall within a particular window (e.g., the last 48 hours, the last five days, the last two weeks, etc.). Accordingly, the receiving agent, expert, or supervisor can be better prepared to address the particular needs of the customer.

In block 426, the interaction management computing device 108 identifies whether the support call should be escalated to a supervisor or an expert. As described previously, on or more thresholds may be compared against to determine whether to escalate the call to a supervisor or an expert. For example, if the same customer has called once within the last 24 hours about the same issue and the call lasted longer than the maximum call threshold, the interaction management computing device 108 may determine to escalate the support call to an expert rather than a supervisor. In another example, if the same customer has called twice within the last 24 hours about the same issue, but neither call lasted longer than the maximum call threshold, the interaction management computing device 108 may determine to escalate the support call to a supervisor rather than an expert, in anticipation that the customer is likely to be irritated.

In block 428, the interaction management computing device 108 determines whether the support call should be escalated to a supervisor (e.g., based on the identification performed in block 426). If so, the method 400 branches to block 430, in which the interaction management computing device 108 places the support call into a support call queue associated with a supervisor. Otherwise, the method 400 branches to block 432, in which the interaction management computing device 108 places the support call into a support call queue associated with an expert.

As described previously, if the interaction management computing device 108 determines not to escalate the support call to a supervisor or an expert in block 424, the method 400 branches to block 434, which is shown in FIG. 4C. In block 434, the interaction management computing device 108 identifies an agent corresponding to the most recent support call. In block 436, the interaction management computing device 108 determines whether the identified agent is available. If so, the method 400 branches to block 438, in which the interaction management computing device 108 places the support call into a support call queue associated with the identified agent. Otherwise, the method 400 branches to block 440, in which the interaction management computing device 108 places the support call into a support call queue for the first available agent. In some embodiments, in block 442, the interaction management computing device 108 may assign a priority level to the support call that indicates the support call has a higher priority level than the non-flagged calls in the support call queue. It should be appreciated that the flagging of the support call may constitute the assignment of the higher priority level, in some embodiments.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for managing unresolved customer interactions in a support call queue management system, the method comprising:
   receiving, by the support call queue management system, a support call from a customer;
   identifying, by an interaction management computing device of the support call queue management system, a customer and a support call type associated with the support call;
   retrieving, by the interaction management computing device, historical interaction data associated with the customer;
   determining, by the interaction management computing device and subsequent to having determined that historical interaction data associated with the customer includes one or more other support calls, whether one or more of the other support calls are related to the received support call based at least in part on the historical interaction data associated with the customer and the support call type of the support call;

selecting, by the interaction management computing device and subsequent to having determined that the one or more of the other support calls are related to the received support call, one of an agent, an expert, or a supervisor for routing the support call to based on:
- a previous support call volume corresponding to the customer; and
- a most recent support call from among the other support calls related to the received support call exceeding a predetermined threshold duration of time; and placing, by the interaction management computing device, the support call into a support call queue of a plurality of support call queues, wherein the support call queue corresponds to the selected on of the agent, the expert, or the supervisor.

2. The method of claim 1, wherein placing the support call into the support call queue of the plurality of support call queues comprises placing the support call into the support call queue of the plurality of support call queues corresponding to a particular one of the agent, the expert, or the supervisor that is associated with a most recent support call of the other support calls.

3. The method of claim 1, wherein determining whether to transmit the support call to one of the agent, the expert, or the supervisor comprises determining whether to transmit the support call based on whether a most recent support call of the other support calls was dropped during an interaction between the customer and a respective one of the agent, the expert, or the supervisor.

4. The method of claim 1, wherein determining whether to transmit the support call to one of the agent, the expert, or the supervisor comprises determining whether to transmit the support call based on a resolution status assigned to a most recent support call of the other support calls.

5. The method of claim 1, wherein determining whether to transmit the support call to one of the agent, the expert, or the supervisor comprises determining whether to transmit the support call based on one or more thresholds associated with a most recent support call of the other support calls.

6. The method of claim 5, wherein the one or more thresholds includes at least one of a maximum call duration threshold and a maximum call count threshold.

7. The method of claim 1, further comprising flagging, by the interaction management computing device and subsequent to having determined that the one or more of the other support calls are related to the received support call, the support call as being associated with a recently received support call.

8. The method of claim 7, wherein flagging the support call includes assigning a priority level of the support call to a higher priority level relative to a priority level of the other support calls in the support call queue that are not flagged.

9. The method of claim 1, wherein the historical interaction data includes at least one of an agent identifier, a customer identifier, a support call type identifier, a note, a resolution status, a start time, an end time, an amount of time the support call has been placed on hold, or a resolution status.

* * * * *